US012711574B2

(12) United States Patent
Moon et al.

(10) Patent No.: US 12,711,574 B2
(45) Date of Patent: Aug. 18, 2026

(54) METHOD AND APPARATUS WITH SUPERSAMPLING

(71) Applicant: SAMSUNG ELECTRONICS CO., LTD., Suwon-si (KR)

(72) Inventors: Jaeyoung Moon, Suwon-si (KR); Nahyup Kang, Suwon-si (KR); Hanjun Kim, Suwon-si (KR); Hyeonseung Yu, Suwon-si (KR); Juyoung Lee, Suwon-si (KR); Hwiryong Jung, Suwon-si (KR); Inwoo Ha, Suwon-si (KR); Seokpyo Hong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 457 days.

(21) Appl. No.: 18/303,210

(22) Filed: Apr. 19, 2023

(65) Prior Publication Data

US 2024/0161233 A1 May 16, 2024

(30) Foreign Application Priority Data

Nov. 10, 2022 (KR) ........................ 10-2022-0149550

(51) Int. Cl.
*G06T 3/4046* (2024.01)
*G06T 3/18* (2024.01)
(Continued)

(52) U.S. Cl.
CPC .............. *G06T 3/4046* (2013.01); *G06T 3/18* (2024.01); *G06T 5/50* (2013.01); *G06T 5/70* (2024.01);
(Continued)

(58) Field of Classification Search
CPC ........... G06T 3/4046; G06T 3/18; G06T 5/50; G06T 5/70; G06T 5/77; G06T 7/20;
(Continued)

(56) References Cited

U.S. PATENT DOCUMENTS 10,783,611 B2 9/2020 Vemulapalli et al.
11,367,165 B2 6/2022 Xiao et al.
(Continued)

FOREIGN PATENT DOCUMENTS

CN 106713889 A 5/2017

OTHER PUBLICATIONS

Yang, Lei, Shiqiu Liu, and Marco Salvi. "A Survey of Temporal Antialiasing Techniques." Computer graphics forum. vol. 39. No. 2. 2020., (15 pages).
(Continued)

*Primary Examiner* — Amandeep Saini
*Assistant Examiner* — Emma Rose Goebel
(74) *Attorney, Agent, or Firm* — MORGAN, LEWIS & BOCKIUS LLP

(57) ABSTRACT

A supersampling method and apparatus are provided. The method includes: receiving a low-resolution three-dimensional (3D) image comprising a current frame and receiving a previous frame preceding the current frame; generating a low-resolution partial image by repeatedly sampling sub-pixel regions of the current frame; warping a high-resolution image, of the previous frame, which has been outputted from a neural network, to a current view corresponding to the current frame; replacing a partial region of the warped high-resolution image of the previous frame with image data from the low-resolution partial image; and generating a high-resolution image of the current frame by applying the high-resolution image of the previous frame, in which the partial region has been replaced, to the neural network.

19 Claims, 13 Drawing Sheets

(51) Int. Cl.

| | |
|---|---|
| ***G06T 3/4053*** | (2024.01) |
| ***G06T 3/4076*** | (2024.01) |
| ***G06T 5/50*** | (2006.01) |
| ***G06T 5/70*** | (2024.01) |
| ***G06T 5/77*** | (2024.01) |
| ***G06T 7/20*** | (2017.01) |

(52) U.S. Cl.
CPC .................. *G06T 5/77* (2024.01); *G06T 7/20* (2013.01); *G06T 2200/04* (2013.01); *G06T 2207/20021* (2013.01); *G06T 2207/20084* (2013.01)

(58) Field of Classification Search
CPC ....... G06T 2200/04; G06T 2207/20021; G06T 2207/20084; G06T 3/4053; G06T 3/4023; G06T 3/4076; G06T 3/4069; G06T 5/20; G06T 15/503; G06T 2200/12
See application file for complete search history.

(56) References Cited

U.S. PATENT DOCUMENTS

| | | | | |
|---|---|---|---|---|
| 11,836,931 | B2 * | 12/2023 | Liu | G06T 7/223 |
| 2019/0206026 | A1 * | 7/2019 | Vemulapalli | G06N 20/00 |
| 2021/0356744 | A1 | 11/2021 | Kempf et al. | |
| 2021/0366082 | A1 * | 11/2021 | Xiao | G06T 11/00 |
| 2022/0092736 | A1 | 3/2022 | Liu et al. | |
| 2022/0156883 | A1 | 5/2022 | Pottorff et al. | |
| 2023/0162468 | A1 * | 5/2023 | Aoki | G06V 20/58 382/103 |
| 2023/0298212 | A1 * | 9/2023 | Tovey | G06V 10/54 382/162 |
| 2024/0073564 | A1 * | 2/2024 | Cho | H04N 13/383 |

OTHER PUBLICATIONS

Extended European search report issued on May 3, 2024, in counterpart European Patent Application No. 23176811.0 (54 pages).

* cited by examiner

METHOD AND APPARATUS WITH SUPERSAMPLING

CROSS-REFERENCE TO RELATED APPLICATIONS

This application claims the benefit under 35 USC § 119(a) of Korean Patent Application No. 10-2022-0149550, filed on Nov. 10, 2022, in the Korean Intellectual Property Office, the entire disclosure of which is incorporated herein by reference for all purposes.

BACKGROUND

1. Field

The following description relates to a super sampling method and a super sampling apparatus.

2. Description of Related Art

Super sampling, an antialiasing technique, may correspond to a process of eliminating aliasing, which are the edges of bumpy pixels. Also, super sampling may correspond to a scheme of smoothing images expressed by computer games or other programs that produce images. For example, a neural super sampling technique based on a deep learning neural network may be used for antialiasing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a super sampling method includes receiving a low-resolution three-dimensional (3D) image including a current frame and one or more previous frames preceding the current frame, generating a low-resolution partial image by sampling sub-pixel regions of the current frame at regular periods, warping a high-resolution image of the previous frame output from a neural network to a current view corresponding to the current frame, replacing a partial region of the warped high-resolution image of the previous frame with the low-resolution partial image, and acquiring a high-resolution image of the current frame by applying the high-resolution image of the previous frame in which the partial region is replaced to the neural network.

The generating of the low-resolution partial image may include determining the sub-pixel regions by dividing one pixel region of the current frame into one high-resolution pixel region to be up-scaled, and generating a low-resolution partial image corresponding to each of the sub-pixel regions by sampling each of the sub-pixel regions at regular periods.

The generating of the low-resolution partial image may include determining the sub-pixel regions by dividing the one pixel region of the current frame into the one high-resolution pixel region to be up-scaled, performing a first sampling on each of the sub-pixel regions at the regular period, performing a second sampling according to an arbitrary sequence at a second regular period different from the regular period within the sub-pixel region in which the first sampling is performed, and generating the low-resolution partial image corresponding to each of the sub-pixel regions based on the first sampling and the second sampling.

The replacing may include replacing the partial region corresponding to the sub-pixel regions in the warped high-resolution image of the previous frame with the low-resolution partial image.

The replacing may include dividing the warped high-resolution image of the previous frame into a set of low-resolution partial images arranged for each channel, and replacing partial images included in the set of low-resolution partial images with the low-resolution partial image.

The warping may include warping the high-resolution image of the previous frame output from the neural network to the current view based on a low-resolution motion vector map corresponding to the current frame and the previous frame.

The super sampling method may further include generating the low-resolution motion vector map indicating a matching relationship between first pixels of the current frame and second pixels of the previous frame by rendering the low-resolution 3D image.

The super sampling method may further include up-scaling the low-resolution motion vector map to a high-resolution scaled motion vector map.

The upscaling may include using an upscaling filter of any one of a nearest neighborhood filter, a bilinear filter, and a bicubic filter to up-scale the low-resolution motion vector map to the high-resolution scaled motion vector map.

The warping may include warping the high-resolution image of the previous frame output from the neural network to the current view based on the motion vector map up-scaled to the high-resolution.

The super sampling method may further include comparing the previous frame with the current frame, and generating a disocclusion map in which different values are determined for each region of the current frame according to whether an object or background that was not visible in the previous frame is visible in the current frame as a result of the comparison.

The generating of the disocclusion map may include determining a first value corresponding to a first region of the current frame in which an object or background that was not visible in the previous frame is visible in the current frame and a second value corresponding to a second region of the current frame in which an object or background visible in the previous frame is also visible in the current frame to generate the disocclusion map.

The super sampling method may further include masking the warped high-resolution image of the previous frame using the disocclusion map.

The masking may include matching the disocclusion map to the warped high-resolution image of the previous frame, masking a region corresponding to a region in which a value of the disocclusion map is the first value in the high-resolution image of the previous frame with a pixel value of "0", and masking a region corresponding to a region in which a value of the disocclusion map is the second value in the high-resolution image of the previous frame with an original pixel value of the previous frame.

The replacing may include replacing a partial region of the high-resolution image of the previous frame masked by the disocclusion map with the low-resolution partial image.

The acquiring of the high-resolution image of the current frame may include acquiring a high-resolution image of the current frame by applying the high-resolution image of the previous frame in which the partial region is replaced to the neural network.

In another general aspect, a super sampling apparatus includes a communication interface configured to receive a low-resolution 3D image including a current frame and one or more previous frames preceding the current frame, and a processor configured to generate a low-resolution partial image by sampling sub-pixel regions of the current frame at regular periods, warp a high-resolution image of the previous frame output from a neural network to a current view corresponding to the current frame, replace a partial region of the warped high-resolution image of the previous frame with the low-resolution partial image, and acquire a high-resolution image of the current frame by applying the high-resolution image of the previous frame in which the partial region is replaced to the neural network.

The processor may determine the sub-pixel regions by dividing one pixel region of the current frame into one high-resolution pixel region to be up-scaled and generate a low-resolution partial image corresponding to each of the sub-pixel regions by sampling each of the sub-pixel regions at regular periods.

The super sampling apparatus may further include a memory including the neural network trained to output the high-resolution image of the current frame in response to the high-resolution image of the previous frame being input.

Other features and aspects will be apparent from the following detailed description, the drawings, and the claims.

Figure 1:
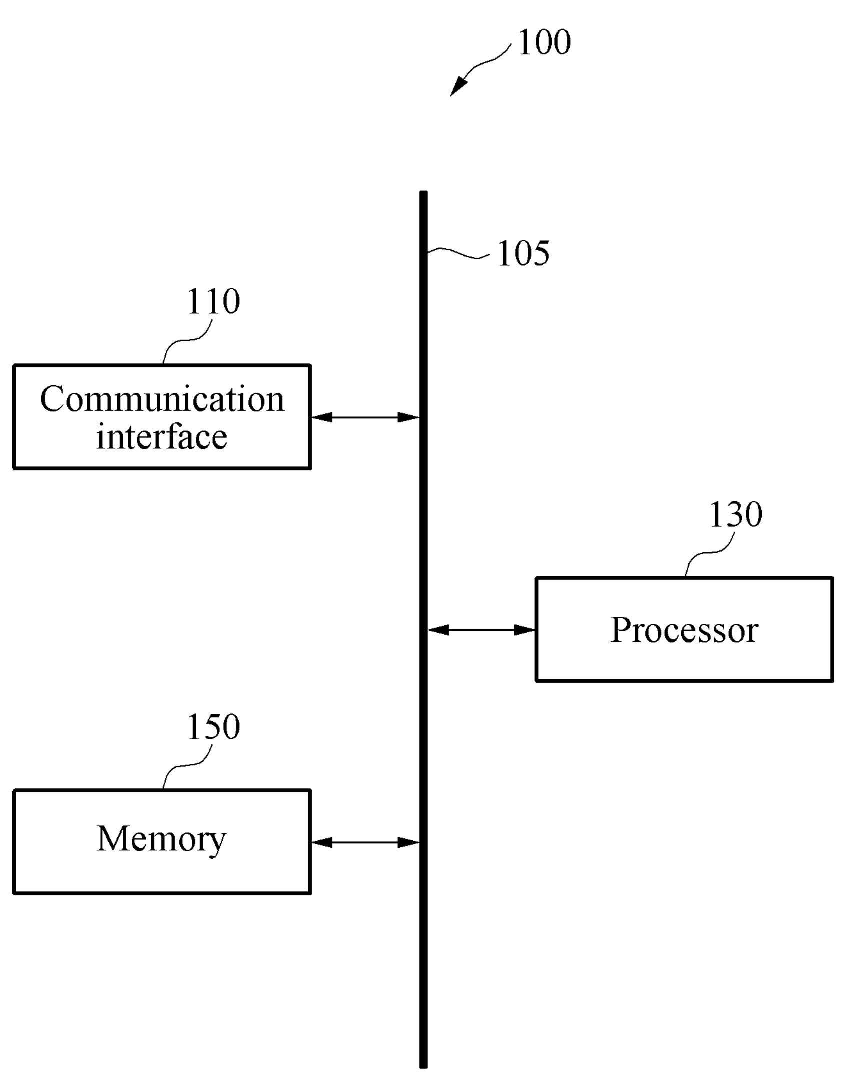
FIG. 1 illustrates an example of a super sampling apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following structural or functional descriptions of examples are merely intended for the purpose of describing the examples and the examples may be implemented in various forms. Here, examples are not construed as limited to the present disclosure and should be understood to include all changes, equivalents, and replacements within the idea and the technical scope of the present disclosure.

Although terms of “first” or “second” are used to explain various components, the components are not limited to the terms. These terms should be used only to distinguish one component from another component. For example, a “first” component may be referred to as a “second” component, and similarly the “second” component may also be referred to as the “first” component.

It will be understood that when a component is referred to as being “connected to” another component, the component can be directly connected or coupled to the other component or intervening components may be present.

The singular forms “a”, “an”, and “the” are intended to include the plural forms as well, unless the context clearly indicates otherwise. It will be further understood that the terms “comprises/comprising” and/or “includes/including” when used herein, specify the presence of stated features, integers, operations, elements, and/or components, but do not preclude the presence or addition of one or more other features, integers, operations, elements, components, and/or populations thereof.

Unless otherwise defined, all terms used herein including technical or scientific terms have the same meaning as commonly understood by one of ordinary skill in the art to which the examples belong. Terms, such as those defined in commonly used dictionaries, should be construed to have meanings matching with contextual meanings in the relevant art and the present disclosure, and are not to be construed as an ideal or excessively formal meaning unless otherwise defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of a super sampling apparatus. Referring to FIG. 1, a super sampling apparatus 100 includes a communication interface 110 and a processor 130. The super sampling apparatus 100 may further include a memory 150.

The communication interface 110 may receive a low-resolution three-dimensional (3D) image including a current frame and one or more previous frames preceding the current frame. The current frame and the one or more previous frames may be two-dimensional (2D) low-resolution image frames. The 3D image may be, for example, a scene of a game, a scene of a movie, or a scene including 3D screen image (e.g., a navigation scene) provided by various visualization functions of an automobile infotainment system, but is not necessarily limited thereto.

The processor 130 generates a low-resolution partial image by sampling sub-pixel regions of the current frame at regular periods. For example, the processor 130 may determine sub-pixel regions by dividing one pixel region of the current frame into one high-resolution pixel region to be up-scaled. The processor 130 may generate a low-resolution partial image corresponding to each of the sub-pixel regions by sampling each of the sub-pixel regions at regular periods. A method by which the processor 130 generates the low-resolution partial image will be described in more detail with reference to FIG. 3 below.

The processor 130 warps a high-resolution image of the previous frame output from a neural network to a current view corresponding to the current frame. The processor 130 may warp the high-resolution image of the previous frame output from the neural network to the current view based on a low-resolution motion vector map corresponding to the current frame and the previous frame. Here, "warping" may not be forward warping, which maps the corresponding points of an input image to a target image using the motion vector map, but may correspond to backward warping in which the input image is mapped and imported using the motion vector map at the corresponding point of the target image. Hereinafter, the term "warp/warping" may be understood to have the meaning of backward warping without separate description.

The "motion vector map" may represent a matching relationship between first pixels of the current frame and second pixels of the previous frame. The "matching relationship" may be understood to indicate which second pixels are matched with the first pixels and to include a moving distance between pixels that match each other. A motion vector map representing the moving distance between pixels of the previous frame that match each other in the current frame may be referred to as a "backward motion vector map", and a motion vector map representing the moving distance between pixels of the current frame that match each other in the previous frame may be referred to as a "forward motion vector map". Hereinafter, the term "motion vector" may be understood to have the meaning of a backward motion vector map without separate description. The motion vector map may be generated by rendering a low-resolution 3D image. A method by which the processor 130 generates the motion vector map will be described below with reference to FIG. 4.

The processor 130 replaces a partial region of a high-resolution image of the previous frame that has been warped with a low-resolution partial image generated from the current frame. The processor 130 may replace a partial region corresponding to the sub-pixel regions of the current frame in the high-resolution image of the previous frame that has been warped with a low-resolution partial image. A method by which the processor 130 replaces the partial region of the high-resolution image of the previous frame that has been warped with the low-resolution partial image corresponding to the current frame will be described in more detail with reference to FIG. 5 below.

The processor 130 obtains a high-resolution image of the current frame by applying the high-resolution image of the previous frame in which the partial region is replaced to the neural network. The neural network may be, for example, a pre-trained neural network for outputting a high-resolution image of a current frame in response to a high-resolution image of a previous frame being input. The neural network may be, for example, a deep neural network or a recurrent neural network, but is not necessarily limited thereto. An example of a configuration of the processor 130 will be described in more detail with reference to FIG. 2 below.

The processor 130 may execute a program and control the super sampling apparatus 100. The code of the program to be executed by the processor 130 may be stored in the memory 150.

In addition, the processor 130 may perform at least one method described with reference to FIGS. 1 to 13 or a scheme corresponding to the at least one method. The processor 130 may be, for example, a mobile application processor (AP), but is not necessarily limited thereto. The processor 130 may be a super sampling apparatus implemented by hardware including a circuit having a physical structure to perform desired operations. For example, the desired operations may include code or instructions included in a program. The hardware-implemented super sampling apparatus 100 may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The memory 150 may include a pre-trained neural network for outputting a high-resolution image of a current frame in response to a high-resolution image of a previous frame being input. In addition, the memory 150 may store a variety of information generated from processing by at least one program and/or the processor 130. The memory 150 may store, for example, a motion vector map generated by the processor 130, a low-resolution partial image, an up-scaling filter, a disocclusion map and/or a disocclusion mask, but is not necessarily limited thereto.

In addition, the memory 150 may store a variety of data and programs. The memory 150 may include a volatile memory or a non-volatile memory. The memory 150 may include a large-capacity storage medium such as a hard disk to store a variety of data.

Figure 2:
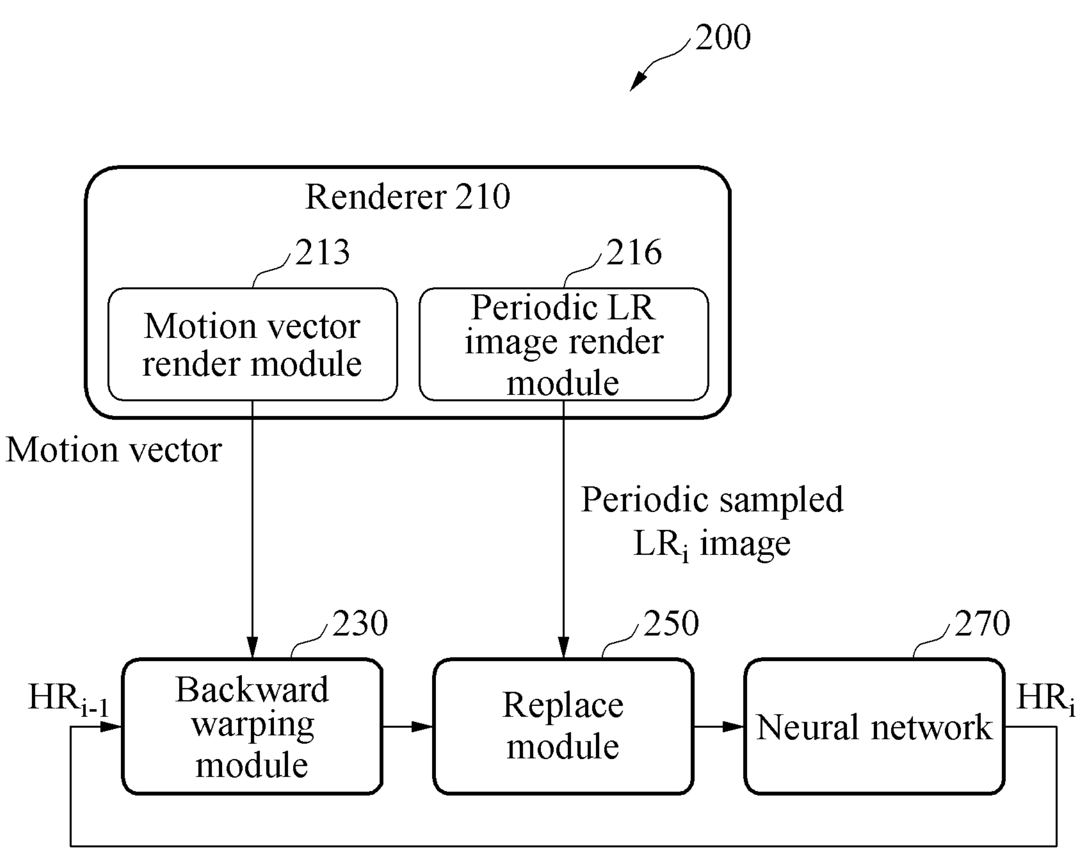
FIG. 2 illustrates an example of a configuration and operation of a super sampling apparatus.

FIG. 2 illustrates an example of a configuration and operation of a super sampling apparatus. Referring to FIG. 2, a super sampling apparatus 200 may include, for example, a renderer 210, a backward warping module 230, a replace module 250, and a neural network 270.

The renderer 210, the backward warping module 230, and the replace module 250 may be composed of, for example, each module of the processor 130 illustrated in FIG. 1. In addition, the neural network 270 may be included in, for example, the processor 130 or may be stored in the memory 150 or a separate cloud server.

The renderer 210 may generate a variety of low-resolution 2D images from a 3D image as the 3D image is input. The 3D image may include, for example, various information related to object animation and/or camera animation included in a corresponding scene. The 2D images generated by the renderer 210 may include, for example, a low-resolution RGB image, a normal map, a depth map and/or a motion vector map, but is not necessarily limited thereto.

The renderer 210 may include, for example, a motion vector render module 213 and a periodic low-resolution (LR) image render module 216.

The motion vector render module 213 may generate a motion vector map with low-resolution size when the renderer 210 generates various 2D images from a scene of an input 3D image. The motion vector map may correspond to a vector map indicating which pixels of a previous frame match each pixel of a current frame. The motion vector map will be further described with reference to FIG. 4 below.

The periodic LR image render module 216 may generate a low-resolution partial image corresponding to the current frame through periodic sampling according to regular periods when the renderer 210 generates various 2D images from the scene of the input 3D image. "Periodic sampling" may be understood as a method of dividing a region of pixels to be sampled in a current frame at regular periods and sampling the divided region of pixels in turn when sampling is performed to generate a low-resolution partial image. The periodic LR image render module 216 may generate a low-resolution partial image (a periodic sampled $LR_i$ image) by, for example, sampling sub-pixel regions obtained by dividing the pixel region of the current frame based on the high resolution to be up-scaled at regular periods. The periodic LR image render module 216 may generate a low-resolution partial image by, for example, sampling the sub-pixel regions obtained by dividing the pixel region of the current frame by uniform periodic sampling at regular periods. Here, the size of the low-resolution partial image may correspond to the size of one sub-pixel region. A method by which the periodic LR image render module 216 performs uniform periodic sampling on pixel regions of the current frame will be described in more detail with reference to FIG. 3 below.

The backward warping module 230 may warp (backward warp) the high-resolution image $HR_{i-1}$ of the previous frame output from the neural network 270 to a current view corresponding to the current frame. The backward warping module 230 may output a high-resolution image of the previous frame warped from a previous view to the current view.

The replace module 250 may replace a partial region of the high-resolution image of the previous frame warped to the current view output from the backward warping module 230 with a low-resolution partial image generated at regular periods by the periodic LR image render module 216. A method by which the replace module 250 replaces the partial region of the high-resolution image of the previous frame with the low-resolution partial image will be described in more detail with reference to FIG. 5 below.

The neural network 270 may infer the high-resolution image of the current frame as the high-resolution image of the previous frame in which a partial region is replaced, which is output from the replace module 250, is applied. Here, the size of the image input to the neural network 270 and the size of the image output from the neural network 270 may be the same in high resolution. The high-resolution image of the current frame output from the neural network 270 may be recursively used again as an input of the backward warping module 230.

In an example, the input and output structures of the neural network 270 may be defined as a frame recurrent structure so that more samples are accumulated throughout the frame. The frame recurrent structure may correspond to a structure in which the samples are accumulated by cyclically applying samples (e.g., high-resolution images of the current frame) output from the neural network 270 to the neural network 270 over several frames. In this example, when a low-resolution image is sampled only in one pixel region of the image frame, it may be difficult to accumulate various information. This is because, for example, when an object and a camera are stationary, only the same value may be obtained when the samples are accumulated over several image frames.

In order to prevent sampling from being performed on only one pixel region of an image frame, the super sampling apparatus 200 may generate a low-resolution partial image through periodic sampling and replace the generated low-resolution partial image with a partial region of a high-resolution image of a previous frame. The super sampling apparatus 200 may replace a periodically rendered low-resolution partial image of the current frame with a partial region of the high-resolution image of the previous frame output from the neural network 270 at a previous view and use the partial image as an input of the neural network 270. To this end, the renderer 210 may perform uniform periodic sampling. Here, "uniform periodic sampling" may be a method of sampling in a periodic rotation by uniformly dividing one pixel region of a low-resolution image into one pixel region of a high-resolution image to be up-scaled when rendering a low-resolution image and adjusting the sampling position to the position of the one pixel of the high-resolution image. For example, when a scaling factor is 2, the one pixel region of the low-resolution image may be uniformly divided into four regions corresponding to the one pixel region of the high-resolution image. The renderer 210 may periodically sample the four uniformly divided regions. The scaling factor may represent a length ratio of one horizontal or vertical axis and may be proportional to the square of the scale.

In an example, the super sampling apparatus 200 may accumulate more samples over an entire image frame through uniform periodic sampling. Uniform periodic sampling may be suitable for the neural network 270 with a frame recurrent structure that accumulates samples over several image frames.

The super sampling apparatus 200 may replace a low-resolution image sampled through uniform periodic sampling with a pixel region corresponding to a high-resolution image output from the neural network 270 at a previous view. When compared to a scheme that simply concatenates a low-resolution image with a high-resolution image output from the neural network 270, the replacement scheme described above may reduce the amount of input memory and computation, thereby enabling neural super sampling to be performed even in mobile terminals.

In addition, by replacing a partial region of a high-resolution image of a previous view output from the neural network 270 with a low-resolution partial image obtained through uniform periodic sampling and using the partial image as an input of the neural network 270, the super sampling apparatus 200 may acquire an improved image restoration ability compared to the scheme of simply concatenating the low-resolution image with the high-resolution image output from the neural network.

Figure 3:
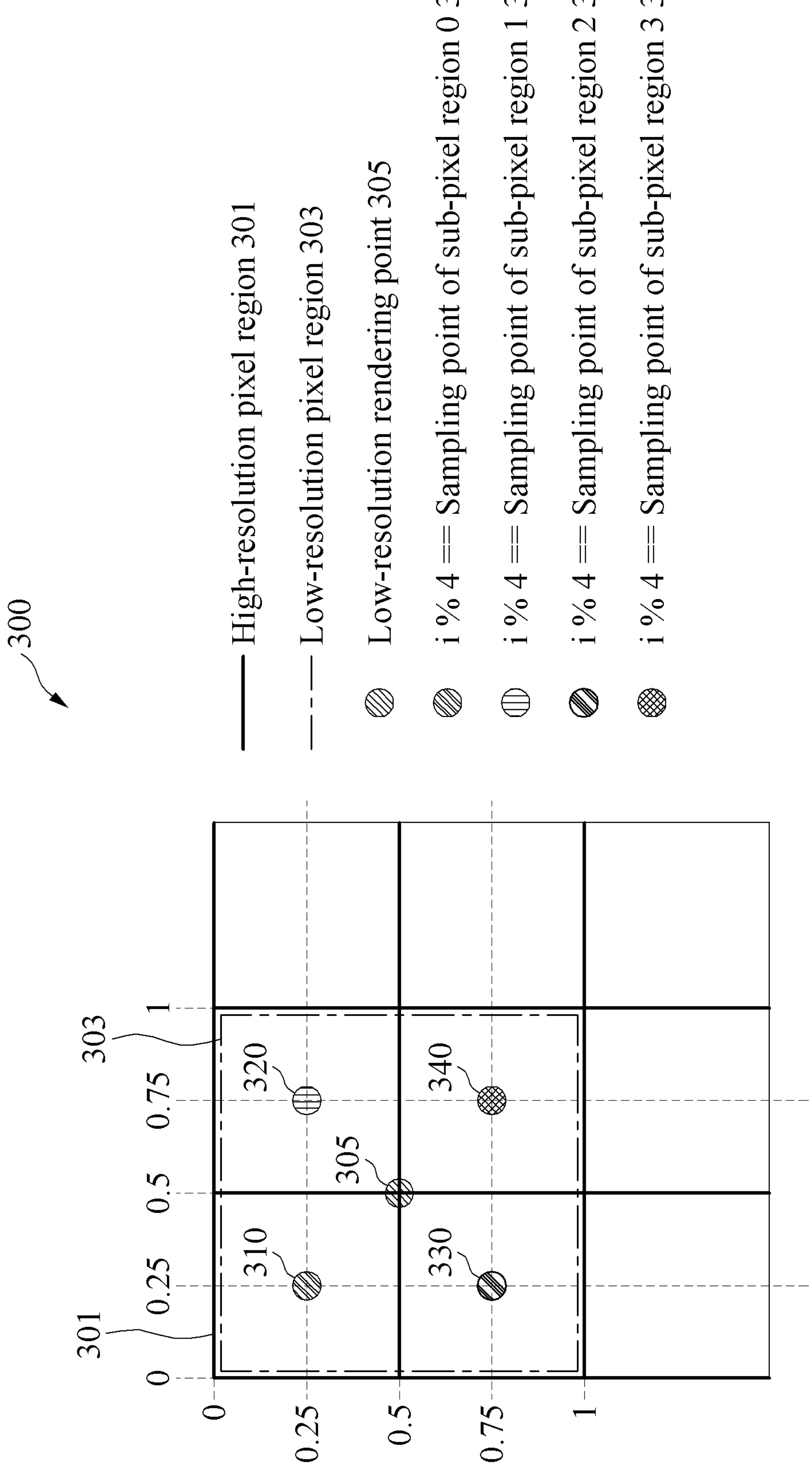
FIG. 3 illustrates an example of a method of sampling sub-pixel regions at regular periods.

FIG. 3 illustrates an example of a method of sampling sub-pixel regions at regular periods. Referring to FIG. 3, an example 300 of a method by which the periodic LR image render module 216 of the super sampling apparatus 200 performs uniform periodic sampling is illustrated.

The periodic LR image render module 216 may uniformly divide one pixel region 301 of a low-resolution current frame into one pixel region 303 of a high-resolution image to be up-scaled. In this example, the one pixel region 301 of the low-resolution current frame may be proportional to a scaling factor of the one pixel region 303 of the high-resolution image.

For example, when the scaling factor is 2, the one pixel region 301 of the low-resolution image may be uniformly divided into four regions corresponding to the one pixel region 303 of the high-resolution image. The periodic LR image render module 216 may periodically sample the four uniformly divided regions.

The periodic LR image render module 216 may adjust a sampling position 305 of the low-resolution current frame to one pixel position (e.g., sampling point 310, sampling point 320, sampling point 330, and sampling point 340) of the high-resolution image and perform periodic sampling at regular periods to generate a low-resolution partial image. In this example, the sampling point 310, the sampling point 320, the sampling point 330, and the sampling point 340 may correspond to the sampling points of each of the four regions in which the one pixel region 301 of the low-resolution image is uniformly divided. The sampling point 310 may correspond to a sampling point of a sub-pixel region in which i % 4==0, and the sampling point 320 may correspond to a sampling point of a sub-pixel region in which i % 4==1. Also, the sampling point 310 may correspond to a sampling point of a sub-pixel region in which i % 4==2, and the sampling point 320 may correspond to a sampling point of a sub-pixel region in which i % 4==3. Here, i may be an index indicating a position of each sub-pixel region.

Thus, the four pixel regions of the current frame obtained by dividing the one pixel region 301 of the low-resolution current frame into the size of the one pixel region 303 of the high-resolution image may be referred to as low-resolution “sub-pixel regions”.

The super sampling apparatus may generate a low-resolution partial image corresponding to each of the sub-pixel regions by sampling each of the four sub-pixel regions once per a predetermined period (e.g., period t1). For example, when the predetermined period is “4”, the periodic LR image render module 216 may periodically sample (or render) the sub-pixel regions in the order of the sampling point 310, sampling point 320, sampling point 330, and sampling point 340.

Since the super sampling apparatus samples one sub-pixel region per period t1 (e.g., 4), the super sampling apparatus may sample all positions of the four sub-pixel regions corresponding to high-resolution per period. Since the super sampling apparatus samples all positions of the sub-pixel regions corresponding to high-resolution per period, for example, when an object and a camera are stationary or a camera constantly moves only in a predetermined direction, sampling being performed only at one sampling point 305 at low-resolution may be prevented and sampling values for more detailed regions such as high-resolution images may be obtained.

For example, when all objects in an image are stationary during the period t1, and the camera is also stationary, the super sampling apparatus may obtain an original high-resolution image for each period t1. The super sampling apparatus may correct the motion of an object or camera in the original high-resolution image via the backward warping module 230 described above.

Figure 4:
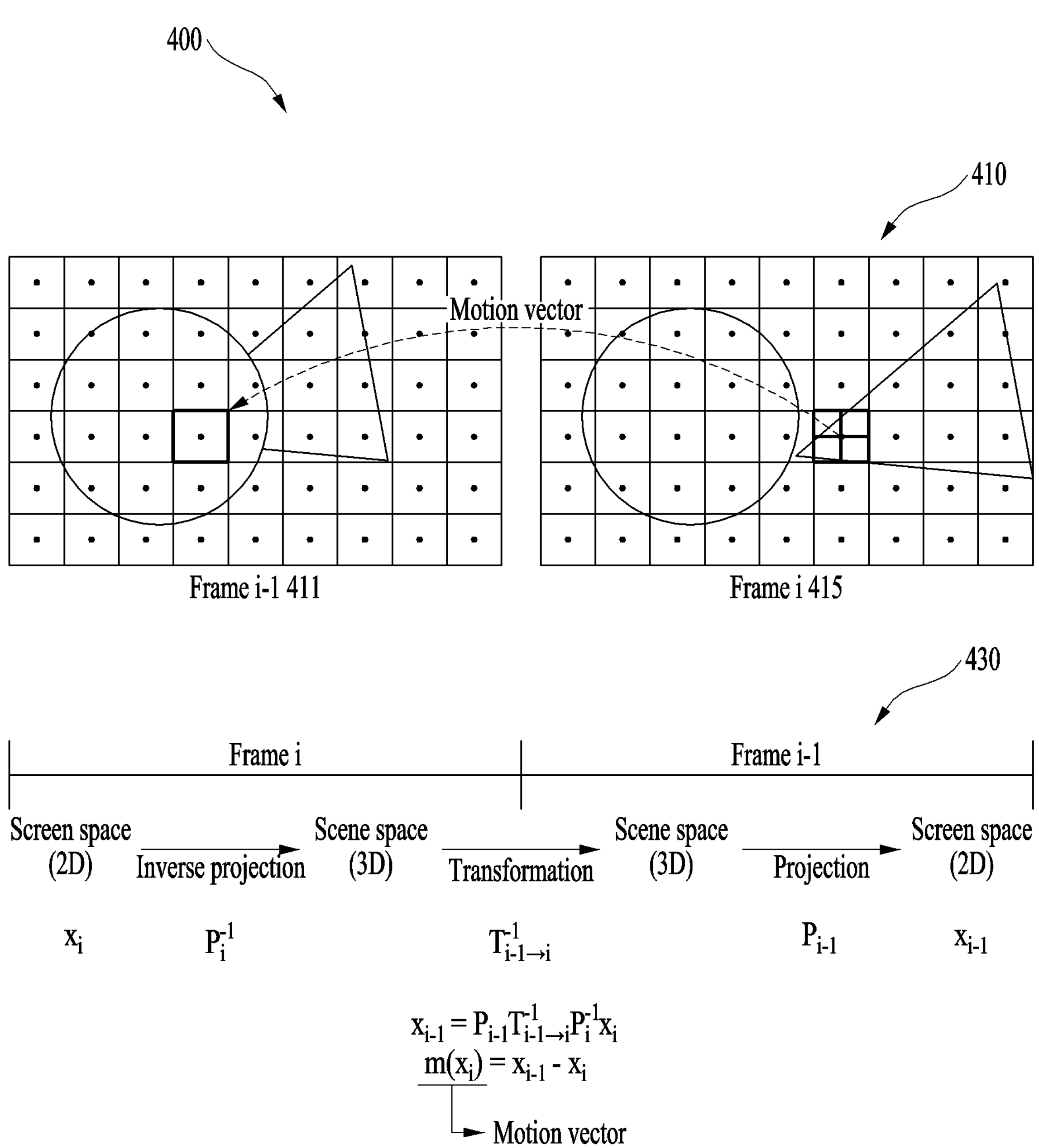
FIG. 4 illustrates an example of a motion vector map.

FIG. 4 illustrates an example of a motion vector map. Referring to FIG. 4, an example 400 of a process of warping a current frame Frame i 415 corresponding to a current view to a previous frame Frame i−1 411 using the motion vector map, which is generated by rendering a low-resolution 3D image, is illustrated.

The motion vector map may include motion vectors indicating a matching relationship (e.g., a moving distance) between first pixels of the current frame Frame i 415 and second pixels of the previous frame Frame i−1 411. The “motion vector(s)” may define, for example, a position where a minimum point visible in the current frame i 415 appears in the previous frame i−1 411 without visibility and color information.

The motion vector may indicate which pixel of the current frame Frame i 415 matches each pixel of the previous frame Frame i−1 411, as illustrated in example 410. That is, the motion vector may indicate a moving distance between a first pixel of the current frame Frame i 415 and a second pixel located at a position corresponding to the first pixel in the previous frame Frame i−1 411.

An example 430 illustrates a process of calculating a backward motion vector between the current frame Frame i 415 and the previous frame Frame i−1 411.

The super sampling apparatus may, for example, project a first pixel $x_i$ at a position corresponding to a triangle in the 2D current frame Frame i 415 into a 3D space by an inverse projection function $$P_i^{-1}$$

in example 430, and then transform the first pixel $x_i$ into a 3D scene space corresponding to a previous view of the previous frame Frame i−1 411 by a transformation function $$T_{i-1\rightarrow i}^{-1}.$$

The super sampling apparatus may express the first pixel $x_i$ transformed into the previous view as a second pixel $x_{i-1}$ in a 2D screen space by a projection function $P_{i-1}$.

Here, the relationship between the first pixel $x_i$ of the current frame Frame i 415 and the second pixel $x_{i-1}$ of the previous frame Frame i−1 411 may be expressed by Equation 1 below.

$$x_{i-1} = P_{i-1} T_{i-1\rightarrow i}^{-1} P_i^{-1} x_i \quad \text{[Equation 1]}$$

In addition, a backward motion vector $m(x_i)$ between the first pixel $x_i$ of the current frame Frame i 415 and the second pixel $x_{i-1}$ of the previous frame Frame i−1 411 may be expressed by Equation 2 below.

$$m(x_i) = x_{i-1} - x_i \quad \text{[Equation 2]}$$

The motion vector may be a vector map of two channels, x and y, in a low-resolution size. The value of each pixel may correspond to a difference between a position of the corresponding pixel in the current frame and a position of the corresponding pixel in the previous frame. A process in which the super sampling apparatus performs warping using motion vectors is as follows. Warping (or mapping) may correspond to a process of moving an image value to a position of a corresponding pixel using a motion vector.

The super sampling apparatus may perform warping (mapping) using the backward motion vector obtained through the above-described process. In forward mapping, values of an input image may be mapped to a target image as much as the moving distance of a pixel using a motion vector. In addition, backward mapping may bring values of an input image as much as the moving distance of a pixel from a target image using a motion vector and map the values. Hereinafter, without separate description, the term “warp/warping” may be understood to refer to “backward warping (mapping)” which is performed using a backward motion vector.

For example, as illustrated in example 410, when pixels corresponding to the right triangle are matched in each of the current frame Frame i 415 and the previous frame Frame i−1 411 by the super sampling apparatus, disocclusion in which the triangle covered by the circle in the previous frame Frame i−1 411 moves with the flow of time and appears in the current frame Frame i 415 may occur.

When disocclusion occurs, the pixels at the position corresponding to the triangle in the current frame Frame i 415 and the pixels at the position corresponding to the triangle in the previous frame Frame i−1 411 may be different. Therefore, even when information of the previous frame Frame i−1 411 is retrieved and used to improve the resolution of the current frame Frame i 415, colors of the different objects may be combined, which may cause artifacts.

In an example, the super sampling apparatus may prevent the generation of artifacts due to disocclusion via a disocclusion map module 915 and a disocclusion masking module 940 to be described below with reference to FIG. 9.

Figure 5:
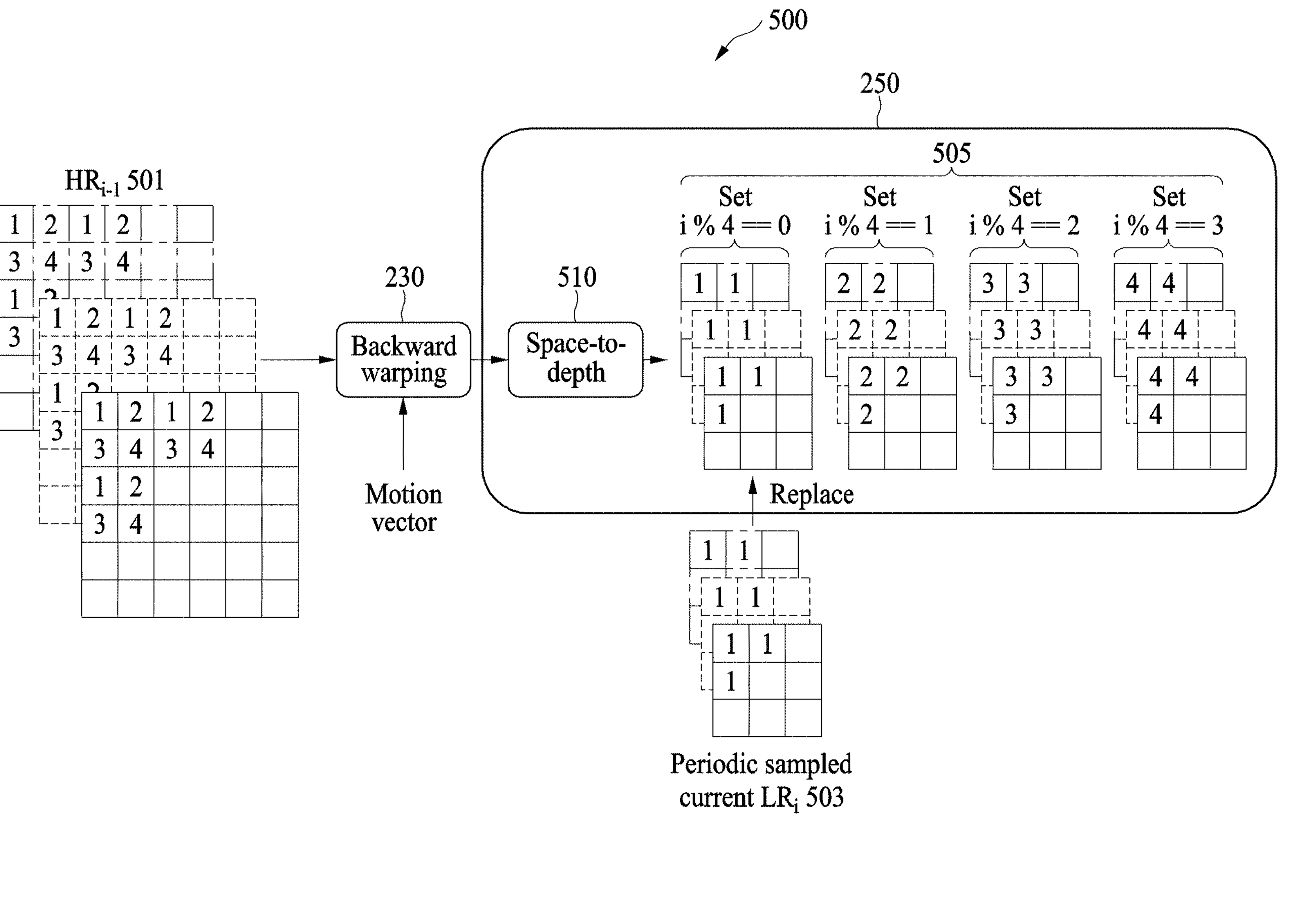
FIG. 5 illustrates an example of a method of replacing a partial region of a high-resolution image of a previous frame with a low-resolution partial image.

FIG. 5 illustrates an example of a method of replacing a partial region of a high-resolution image of a previous frame with a low-resolution partial image. Referring to FIG. 5, an example 500 of a method by which the replace module 250 replaces a high-resolution image of a previous frame, which is a high-resolution image $HR_{i-1}$ 501 of the previous frame backward-warped by the backward warping module 230 to a current view by applying a motion vector, with a low-resolution partial image 503 which is periodically rendered, is illustrated.

The replace module 250 may replace a partial region corresponding to the sub-pixel regions of the current frame in the high-resolution image of the previous frame warped by the backward warping module 230 with the low-resolution partial image 503. As described above, when the pixel regions of the current frame in low-resolution divided by the size of one pixel region in high-resolution are referred to as low-resolution "sub-pixel regions", the super sampling apparatus may replace a partial region of the warped, high-resolution image of the previous frame output from the backward warping module 230 in response to one sub-pixel region sampled according to the period t1 with the low-resolution partial image 503 corresponding to the sub-pixels. Here, the replacement of the partial image 503 may be performed by the super sampling apparatus 200 changing an address value in which the data of the partial region of the high-resolution image of the previous frame is stored to an address value in which the data of the low-resolution partial image 503 is stored.

For example, the replace module 250 may directly replace a partial region of a previous frame warped in a high-resolution state with the low-resolution partial image 503.

Alternatively, in order to efficiently reuse the previous frame warped in the high-resolution state, the replace module 250 may, for example, replace a warped partial region of the previous frame with the low-resolution partial image 503 by using a space-to-depth module 510.

The space-to-depth module 510 may transform the high-resolution image of the previous frame warped by the backward warping module 230 into, for example, low-resolution images for each of a plurality of channels (or depths) by mapping the high-resolution image of the previous frame to a low-resolution channel space via a transformation function.

The space-to-depth module 510 may divide the high-resolution image (e.g., the high-resolution image $HR_{i-1}$ 501 of the previous frame after warping) of the plurality of channels into sets 505 of low-resolution partial images arranged in each channel dimension for each RGB channel. The space-to-depth module 510 may divide the high-resolution image of the plurality of channels into the sets 505 of low-resolution partial images as many as, for example, the square of the upscaling scale(s) and arrange the divided sets 505 of partial images in the channel dimension. By doing so, the shape and size of data may be changed to the same shape and size as the low-resolution partial image 503.

The transformation function $S_s$ may be expressed by, for example, Equation 3 below.

$$S_s:[0,1]^{sH\times sW\times C}\rightarrow[0,1]^{H\times W\times s^2C} \quad \text{[Equation 3]}$$

Here, s may denote an up-scaling scale factor, H may denote the height of the partial images, W may denote the width of the partial images, and C may denote the number of channels.

Also, an operator $S_s(I)_{i,j,k}$ of the space-to-depth transformation may be expressed by Equation 4 below.

$$S_S(I)_{i,j,k}=I_{si+(k/s)\%s,\ sj+(k/s)\%s,\ (k/s)\%s} \quad \text{[Equation 4]}$$

Equation 4 is expressed by zero-based indexing, % may denote a modulus, and / may denote integer division. Here, I may denote a high-resolution image of a (warped) previous frame, and i, j, and k may denote indexes for each dimension of a set of transformed low-resolution partial images.

The replace module 250 may replace the partial images included in the sets 505 of low-resolution partial images with the low-resolution partial image 503 which is periodically rendered. For example, in a first period, the replace module 250 may replace a set of partial images including the number 1 among the sets 505 of partial images with the low-resolution partial image 503 which is periodically rendered. The low-resolution partial image 503 which is periodically rendered may correspond to a partial image related to the number 1.

Since the replace module 250 renders the low-resolution image while periodically replacing the image with a pixel region corresponding to high-resolution, the low-resolution partial image 503 which is periodically rendered may be overwritten in (a partial region of) a high-resolution image region of the previous frame, thereby reducing input memory usage while securing ground truth by 1/(scale^2) of the high-resolution for every frame.

Through the above-described process, the replace module 250 may output an image having the same size as the high-resolution image (e.g., a high-resolution image of a previous frame in which a partial region is replaced).

Figure 6:
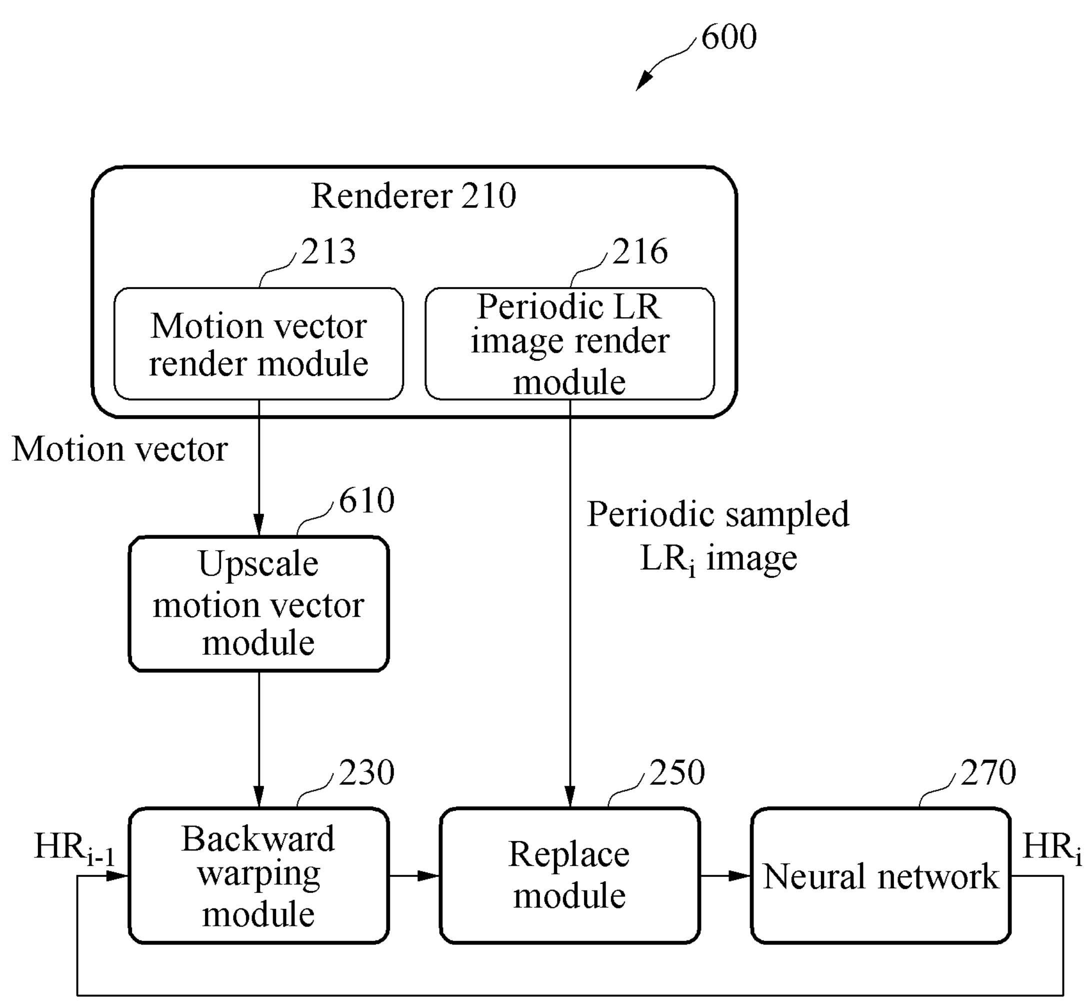
FIG. 6 illustrates an example of a configuration and operation of a super sampling apparatus that up-scales a motion vector.

FIG. 6 illustrates an example of a configuration and operation of a super sampling apparatus that up-scales a motion vector. Referring to FIG. 6, an example 600 of a configuration of the super sampling apparatus 200 further including an upscale motion vector module 610 for up-scaling a motion vector is illustrated. Hereinafter, as the upscale motion vector module 610 is added, operations different from those of the super sampling apparatus 200 illustrated in FIG. 2 will be mainly described.

The upscale motion vector module 610 may upscale a low-resolution motion vector map generated by the motion vector render module 213 to a high-resolution motion vector map. The upscale motion vector module 610 may use, for example, an upscaling filter of any one of a nearest neighborhood filter, a bilinear filter, and a bicubic filter to up-scale a low-resolution motion vector map to a high-resolution motion vector map.

When the low-resolution motion vector map is up-scaled to the high-resolution motion vector map by the upscale motion vector module 610, the backward warping module 230 may warp a high-resolution image $HR_i$ of a previous frame output from the neural network 270 to a current view based on the motion vector map up-scaled to a high-resolution size.

The backward warping module 230 may apply the high-resolution motion vector map generated by the upscale motion vector module 610 to the high-resolution image $HR_i$ of the previous frame output from the neural network 270 to perform backward warping. The backward warping module 230 may output the high-resolution image of the previous frame that is backward-warped.

The upscale motion vector module 610 may be selectively added to the super sampling apparatus 200 according to, for example, the type of application and/or operating environment.

Figure 7:
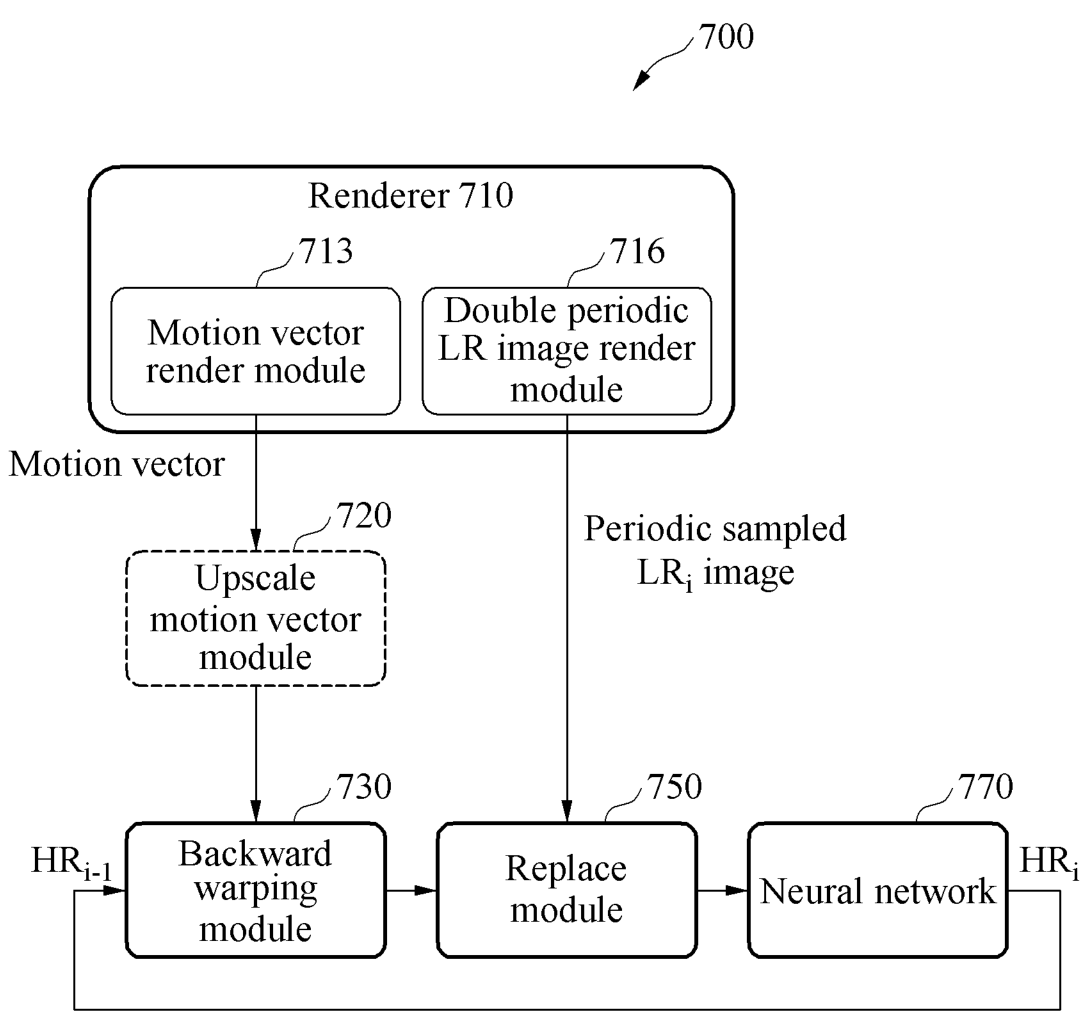
FIG. 7 illustrates an example of a configuration and operation of a super sampling apparatus that performs sampling according to a double period.

FIG. 7 illustrates an example of a configuration and operation of a super sampling apparatus that performs sampling according to a double period. Referring to FIG. 7, an operation by which a super sampling apparatus 700 changes the periodic LR image render module 216 of the super sampling apparatus 200 to a double periodic LR image render module 716 is illustrated.

The operations of a renderer 710, a motion vector render module 713, a backward warping module 730, a replace module 750, and a neural network 770 of the super sampling apparatus 700 may be identical to the operations of the renderer 210, the motion vector render module 213, the backward warping module 230, the replace module 250, and the neural network 270 described above with reference to FIG. 2. Also, the operation of an upscale motion vector module 720 may be identical to the operation of the upscale motion vector module 610 described above with reference to FIG. 6. Accordingly, hereinafter, operations of the super sampling apparatus 700 different from the operations of the super sampling apparatuses 200 and 600 described with reference to FIGS. 2 and 6 will be mainly described.

The double periodic LR image render module 716 may sample sub-pixel regions by dividing them into double periods when sampling the sub-pixel regions to generate a low-resolution partial image.

Unlike the periodic LR image render module 216 illustrated in FIG. 2, the double periodic LR image render module 716 may sample the sub-pixel regions according to a double period in which an arbitrary sequence is added to each period during rendering, thereby generating low-resolution partial images corresponding to each of the sub-pixel regions.

The double periodic LR image render module 716 may generate low-resolution partial images by sampling sub-pixel regions according to a double period, so that, for example, when the movement of a camera is constant in a predetermined direction or stationary, the sampling points may be prevented from being overlapped, and more sub-divided pixel values may be obtained.

The double periodic LR image render module 716 may, for example, determine the sub-pixel regions by dividing one pixel region of the current frame into one high-resolution pixel region to be up-scaled. The double periodic LR image render module 716 may perform a first sampling on each of the sub-pixel regions of the current frame at regular periods. The double periodic LR image render module 716 may perform a second sampling according to an arbitrary sequence at a second regular period different from the regular period within the sub-pixel region in which the first sampling is performed. In this example, the second sampling may correspond to, for example, jitter sampling.

The double periodic LR image render module 716 may generate a low-resolution partial image corresponding to each of the sub-pixel regions based on the first sampling and the second sampling. A method by which the double periodic LR image render module 716 performs sampling according to the double period is described in more detail with reference to FIG. 8 below.

Figure 8:
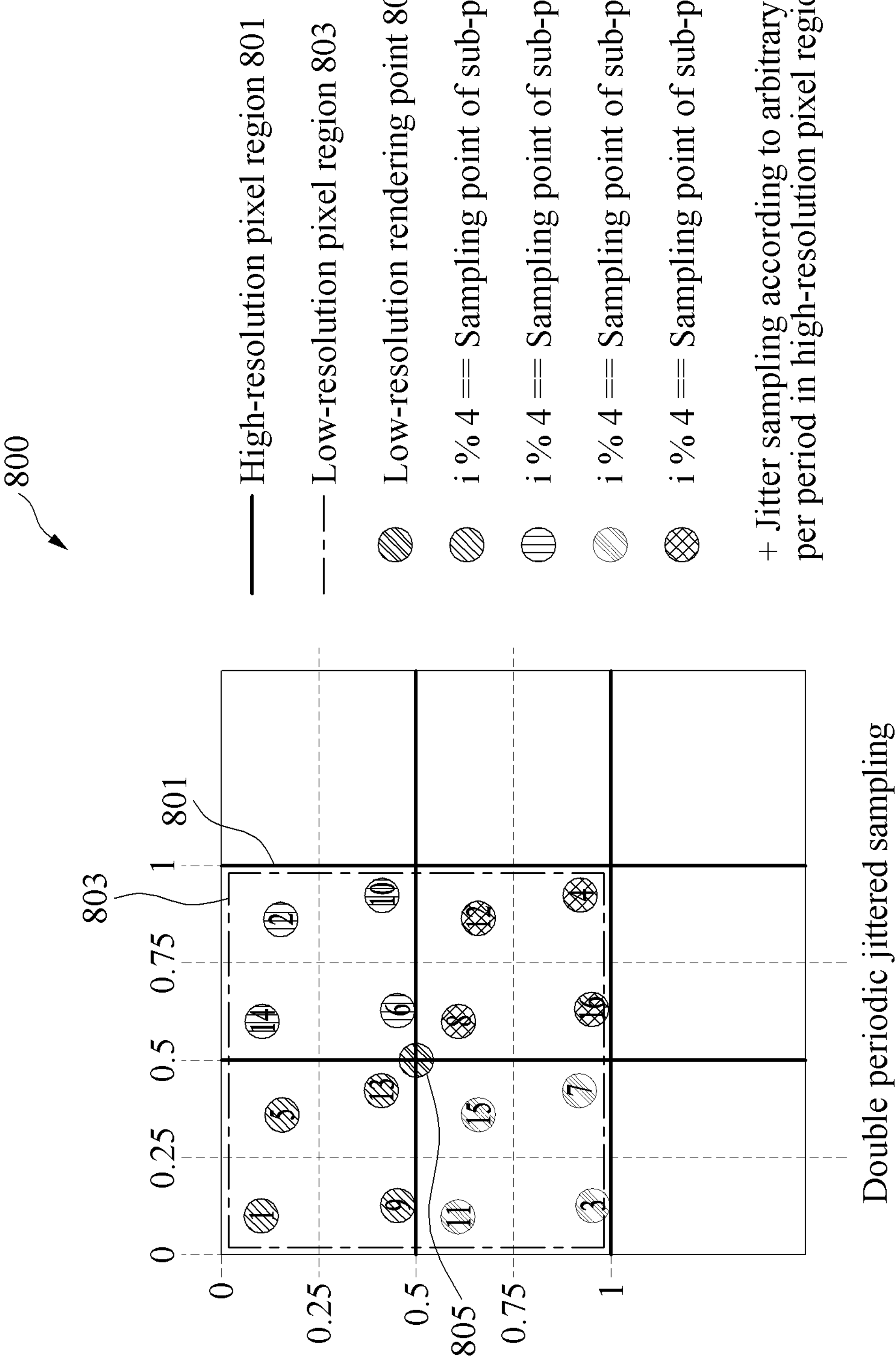
FIG. 8 illustrates an example of a method of performing sampling according to a double period in the super sampling apparatus of FIG. 7.

FIG. 8 illustrates an example of a method of performing sampling according to a double period in the super sampling apparatus of FIG. 7. Referring to FIG. 8, an example 800 of a process in which the double periodic LR image render module 716 samples sub-pixel regions of a low-resolution current frame according to a double period is illustrated.

The double periodic LR image render module 716 may, for example, uniformly divide one pixel region 801 of a low-resolution current frame into one pixel region 803 of a high-resolution image to be up-scaled. The double periodic LR image render module 716 may adjust a sampling position 805 of the low-resolution current frame to one pixel position (e.g., positions 1, 2, 3 and 4) of the high-resolution image and perform periodic sampling on each sub-pixel region of the current frame at regular periods to generate low-resolution partial images. In this example, the one pixel region of the low-resolution current frame may be proportional to a scaling factor of the one pixel region of the high-resolution image.

The double periodic LR image render module 716 may perform the first sampling on each of the sub-pixel regions once at a regular period (e.g., a period t1). The double periodic LR image render module 716 may perform the second sampling according to an arbitrary sequence at the second regular period different from the regular period on each of the sub-pixel regions in which the first sampling is performed.

For example, when the double periodic LR image render module 716 performs the first sampling on one sub-pixel region (a) per period t1, the double periodic LR image render module 716 may perform the second sampling within the sub-pixel region (a) in an arbitrary sequence (e.g., positions 5, 6, 7, and 8→positions 9, 10, 11, and 12→positions 13, 14, 15, and 16) according to another period t2. Accordingly, an entire sampling period corresponding to each of the sub-pixel regions may be $t1 \times t2$.

When the double periodic LR image render module 716 performs the second sampling according to the period t2, for example, the sub-pixel region (a) may be second sampled in a known low-discrepancy sequence such as a Hammersley sequence or a Halton sequence. The low-discrepancy sequence may be a sequence having a small discrepancy measure up to the N-th term of the sequence.

The Halton sequence may correspond to a sequence used to generate points in space for a numerical scheme such as a Monte Carlo simulation. While the Halton sequence is deterministic, computationally fast, and easy to implement, it may correspond to a sequence of points within a unit nn-cube with low discrepancy. The Hammersley sequence is identical to the Halton sequence except that it is in the first dimension where the points are equidistant from each other.

The double periodic LR image render module 716 may use the Hammersley sequence or Halton sequence for each sub-pixel region instead of the entire low-resolution current frame during the second sampling, so that sampling is not biased to one sub-pixel region.

In addition, the double periodic LR image render module 716 may perform the second sampling at the second regular period within the sub-pixel region in which the first sampling is performed, so that the replace module 750 may replace a partial region of a high-resolution image of the previous frame warped by the backward warping module 730 with low-resolution partial images according to a regular period (e.g., a period t1) during which the first sampling is performed.

Figure 9:
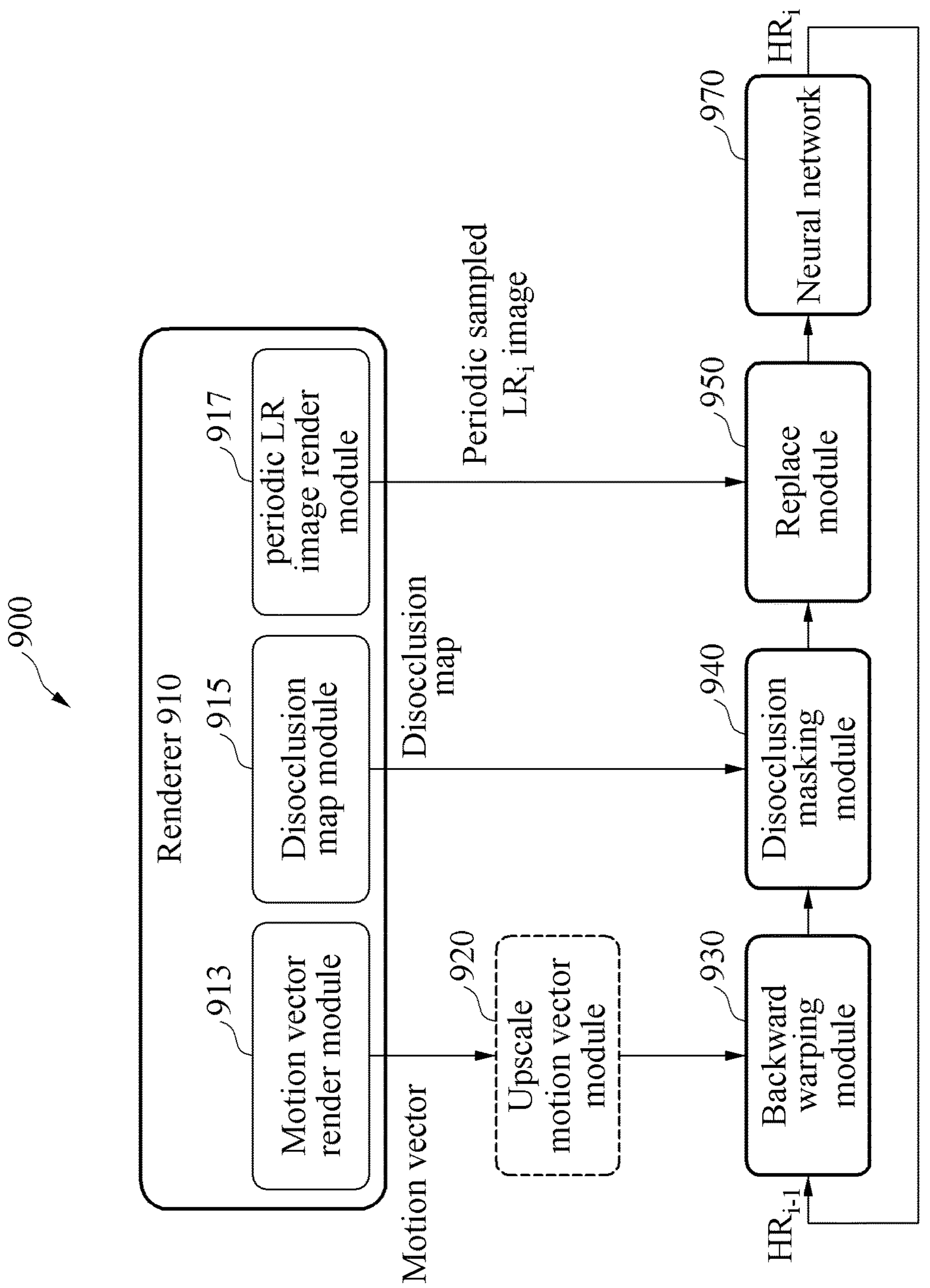
FIG. 9 illustrates an example of a configuration and operation of a super sampling apparatus that performs masking using a disocclusion map.

FIG. 9 illustrates an example of a configuration and operation of a super sampling apparatus that performs masking using a disocclusion map. Referring to FIG. 9, an operation of a super sampling apparatus 900 in which a disocclusion map module 915 and a disocclusion masking module 940 are added to the super sampling apparatus 200 is illustrated.

The operations of a renderer 910, a motion vector render module 913, a periodic LR image render module 917, a backward warping module 930, a replace module 950, and a neural network 970 of the super sampling apparatus 900 may be identical to the operations of the renderer 210, the motion vector render module 213, the periodic LR image render module 216, the backward warping module 230, the replace module 250, and the neural network 270 described above with reference to FIG. 2. Also, the operation of an upscale motion vector module 920 may be identical to the operation of the upscale motion vector module 610 illustrated in FIG. 6. Accordingly, hereinafter, operations of the super sampling apparatus 900 different from the operations of the super sampling apparatuses 200 and 600 described with reference to FIGS. 2 and 6 will be mainly described.

As described above, "disocclusion" may refer to an object or background that was not visible in a previous frame becoming visible in a current frame (or such a region), for example, due to the movement of the object or the movement of the camera.

The disocclusion map module 915 may compare the previous frame with the current frame and generate a disocclusion map in which different values are determined for each region of the current frame according to whether an object or background that was not visible in the previous frame is visible in the current frame as a result of the comparison. "Whether an object or background that was not visible in the previous frame is visible in the current frame" may be understood to have the meaning of whether or not there is a disocclusion region in the current frame.

Whether an object or background that was not visible in the previous frame is visible in the current frame may be determined using, for example, a motion vector and depth maps of the previous frame and the current frame. The depth map, which represents a depth value corresponding to each pixel of a low-resolution image, may be generated by the renderer 210.

When the depth map of the previous frame is warped to the current frame using the motion vector, the depth value of a region corresponding to the disocclusion region in the depth map of the previous frame that is warped may remain. This is the same as a disocclusion region remaining in an image. The disocclusion region may correspond to "a region in which an object or background that was not visible in the previous frame is visible in the current frame". Therefore, a visible region in the current frame may be a region in which an object covered in the previous frame is visible due to the movement of the object or the camera, and in terms of the depth map, may be a region in which the depth value increases. Accordingly, a ratio or difference value between the depth map of the current frame and the warped depth map of the previous frame may occur. In this case, the disocclusion region may be identified by masking the ratio or difference value between the depth map of the current frame and the warped depth map of the previous frame based on an arbitrary threshold.

Alternatively, the disocclusion region may be identified using a global ID map generated by the renderer 210 in lieu of the depth map in the above-described process. The global ID map may be an image size map that uniquely expresses an ID of an object corresponding to each pixel of the image.

The disocclusion map module 915 may determine, for example, a first value (e.g., "1") corresponding to a first region ("disocclusion region") of the current frame in which an object or background that was not visible in the previous frame is visible in the current frame). In addition, the disocclusion map module 915 may determine a second value (e.g., "0") corresponding to a second region ("a region other than the disocclusion region") of the current frame in which an object or background visible in the previous frame is also visible in the current frame to generate a disocclusion map. The disocclusion map may correspond to, for example, a map in which a first value (e.g., "1") is assigned to a first region corresponding to a disocclusion region in the current frame, and a second value (e.g., "0") is assigned to a second region that is not a disocclusion region.

The disocclusion masking module 940 may mask a high-resolution image of the previous frame warped by the backward warping module 930 using the disocclusion map generated by the disocclusion map module 915.

The disocclusion masking module 940 may match the disocclusion map to the high-resolution image of the previous frame warped by the backward warping module 930 using the motion vector of the motion vector map. The disocclusion masking module 940 may mask a region corresponding to a region in which a value of the disocclusion map is a first value ("1") in the high-resolution image of the previous frame with a pixel value of "0". In addition, the disocclusion masking module 940 may mask a region corresponding to a region in which a value of the disocclusion map is a second value ("0") in the high-resolution image of the previous frame with the original pixel value of the previous frame.

The disocclusion masking module 940 may transmit the high-resolution image of the previous frame masked in a color (e.g., black) corresponding to a pixel value of "0" corresponding to the disocclusion region in the high-resolution image of the previous frame warped by the backward warping module 930 to the replace module 950.

The replace module 950 may replace a partial region of the high-resolution image of the previous frame in which the disocclusion region is masked in black with a low-resolution partial image generated by the periodic LR image render module 917.

Here, the region masked by the disocclusion map in the high-resolution image of the previous frame is a black region with a pixel value of "0", but since a partial region is replaced with a low-resolution partial image by the replace module 950, image information (e.g., color information of the low-resolution image) may be included. The replace module 950 may obtain a high-resolution image of the current frame by applying the high-resolution image of the previous frame in which a partial region is replaced with the low-resolution partial image to the neural network 970.

In an example, after erasing the information of the disocclusion region that may cause artifacts during super sampling in the high-resolution image of the previous frame through the above-described process with the pixel value "0" (black), the generation of artifacts due to disocclusion may be reduced by applying the high-resolution image of the previous frame including only information of the low-resolution partial image to the neural network 970.

Figure 10:
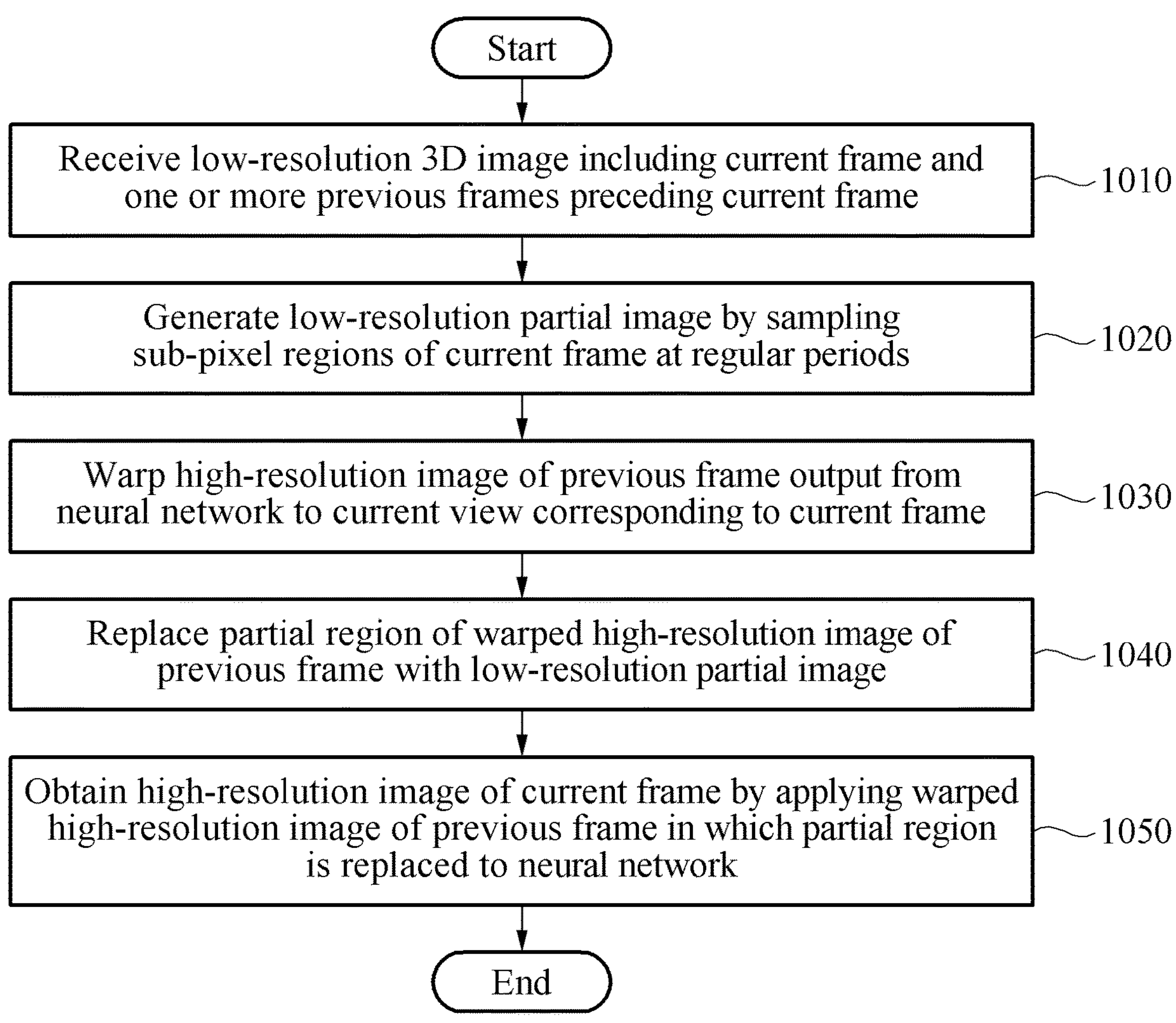
FIGS. 10 to 13 illustrate examples of super sampling methods.

FIG. 10 illustrates an example of a super sampling method. Operations to be described hereinafter may be performed sequentially, but not necessarily sequentially. For example, the order of the operations may be changed and at least two of the operations may be performed in parallel.

Referring to FIG. 10, a super sampling apparatus may obtain a high-resolution image of a current frame through operations 1010 to 1050.

In operation 1010, the super sampling apparatus may receive a low-resolution 3D image including a current frame and one or more previous frames preceding the current frame. For example, when the current frame is an image frame corresponding to t hour, the one or more previous frames may be an image frame corresponding to t−1 hour or t−1 and t−2 hours, respectively. The 3D image may be, for example, a scene of a game, a scene of a movie, and/or a 3D scene (e.g., a navigation scene) provided by various visualization functions of an automobile infotainment system, but is not necessarily limited thereto.

The super sampling apparatus may obtain information on any one or any combination of a 3D image (or 3D scene), along with, for example, a camera capturing the 3D image, at least one object included in the 3D scene, polygons constituting the at least one object, and vertexes and edges of the polygons. The information on the camera capturing the 3D image may include, for example, a focal length of the camera, a viewing angle of the camera, and pixel information of the camera, but is not necessarily limited thereto.

In operation 1020, the super sampling apparatus may generate a low-resolution partial image by sampling sub-pixel regions of the current frame at regular periods. The super sampling apparatus may generate a low-resolution partial image via, for example, the periodic LR image render module 216 described above.

In operation 1030, the super sampling apparatus may warp a high-resolution image of the previous frame output from a neural network to a current view corresponding to the current frame. The super sampling apparatus may warp the high-resolution image of the previous frame to a current view corresponding to the current frame by the backward warping modules 230, 730, and 930.

In operation 1040, the super sampling apparatus may replace a partial region of the high-resolution image of the previous frame warped in operation 1030 with the low-resolution partial image generated in operation 1020. The super sampling apparatus may replace the partial region of the high-resolution image with a partial image of low-resolution by, for example, the above-described replace modules 250, 750, and 950.

In operation 1050, the super sampling apparatus may obtain a high-resolution image of the current frame by applying the high-resolution image of the previous frame in which the partial region is replaced in operation 1040 to the neural network. The neural network may be, for example, the aforementioned neural networks 270, 770, and 970, but is not necessarily limited thereto.

Figure 11:
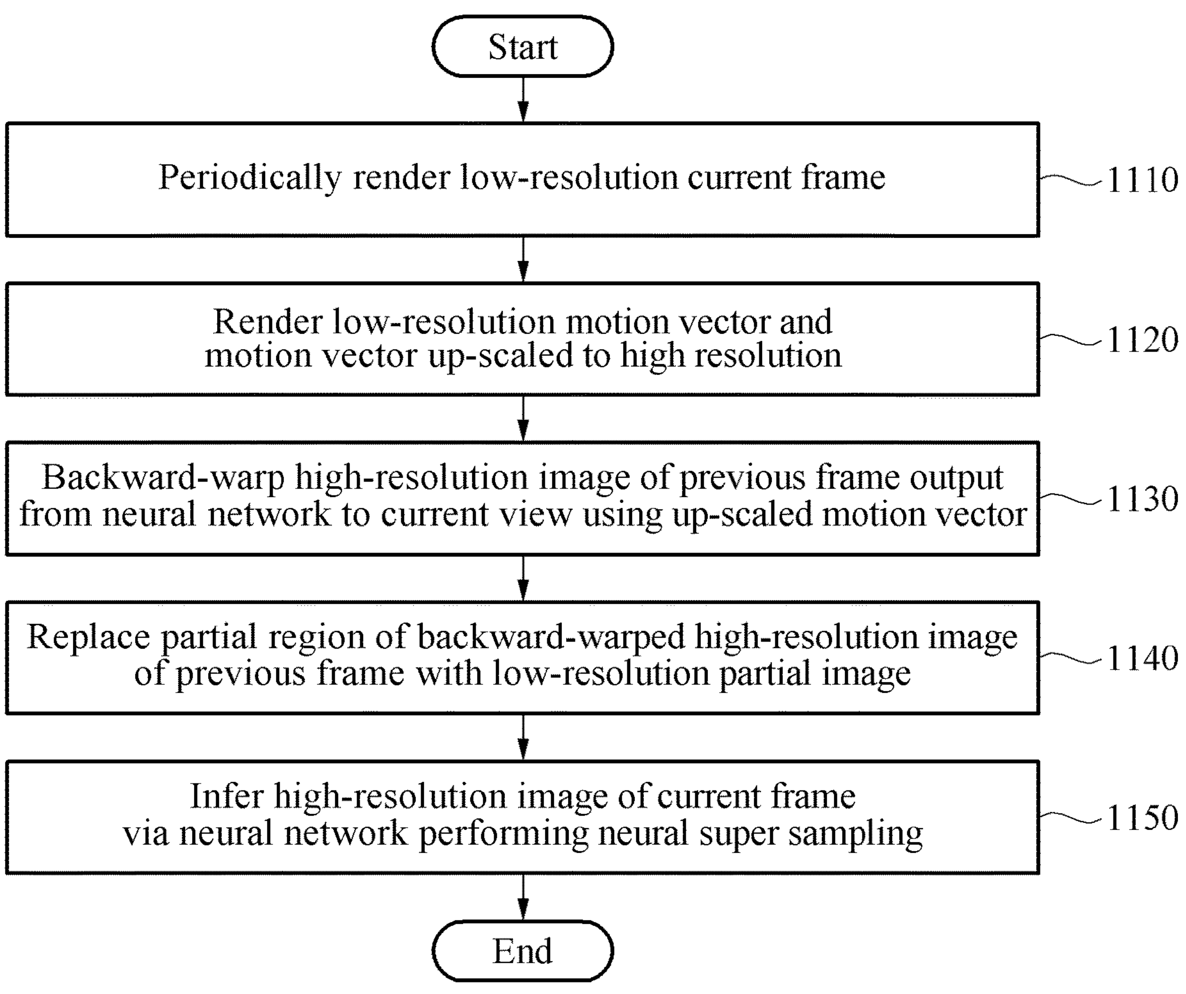

FIG. 11 illustrates an example of a super sampling method. Operations to be described hereinafter may be performed sequentially, but not necessarily sequentially. For example, the order of the operations may be changed and at least two of the operations may be performed in parallel.

Referring to FIG. 11, a super sampling apparatus may infer a high-resolution image of a current frame through operations 1110 to 1150.

In operation 1110, the super sampling apparatus may periodically render a low-resolution current frame. When a low-resolution 3D image including a current frame and one or more previous frames preceding the current frame is input, the super sampling apparatus may periodically render the low-resolution current frame using the renderers 210, 710, and 910 described above.

In operation 1120, the super sampling device may render a motion vector of low resolution and a motion vector up-scaled to high resolution. The super sampling apparatus may generate a low-resolution motion vector map including motion vectors via the motion vector render modules 213, 713, and 913 described above. The super sampling apparatus may up-scale the low-resolution motion vector map to a high-resolution motion vector map via the upscale motion vector module 610.

In operation 1130, the super sampling apparatus may backward-warp a high-resolution image of a previous frame output from a neural network to a current view via the backward warping modules 230, 730, and 930 using the motion vector up-scaled in operation 1120.

In operation 1140, the super sampling apparatus may replace a partial region of the high-resolution image of the previous frame backward-warped in operation 1130 with a low-resolution partial image via the above-described replace modules 250, 750, and 950.

In operation 1150, the super sampling apparatus may infer a high-resolution image of the current frame via the neural networks 270, 770, and 970 performing neural super sampling.

Figure 12:
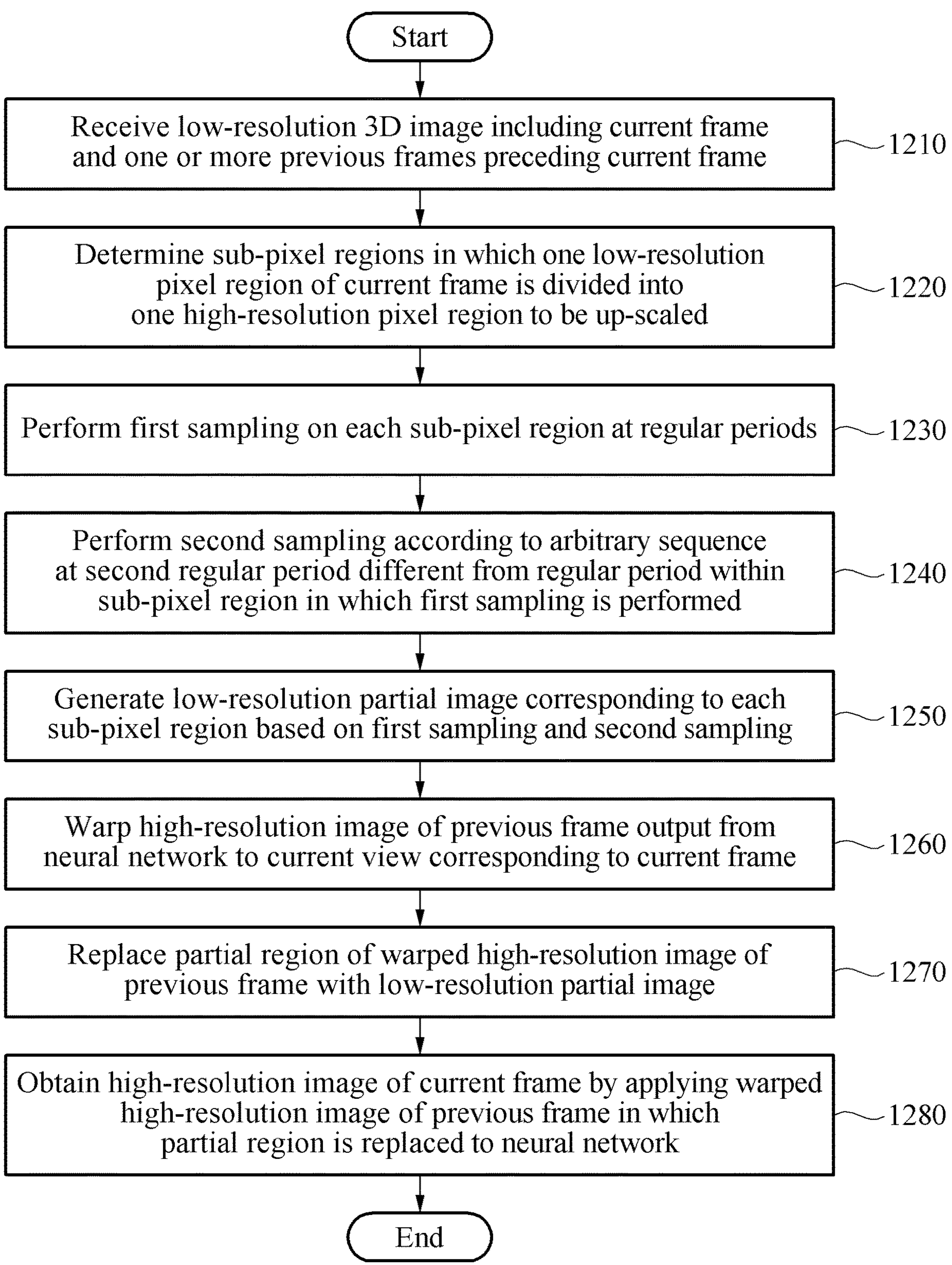

FIG. 12 illustrates an example of a super sampling method. Operations to be described hereinafter may be performed sequentially, but not necessarily sequentially. For example, the order of the operations may be changed and at least two of the operations may be performed in parallel.

Referring to FIG. 12, a super sampling apparatus may obtain a high-resolution image of a current frame through operations 1210 to 1280.

In operation 1210, the super sampling apparatus may receive a low-resolution 3D image including a current frame and one or more previous frames preceding the current frame.

In operation 1220, the super sampling apparatus may determine sub-pixel regions in which one low-resolution pixel region of the current frame is divided into one high-resolution pixel region to be up-scaled.

In operation 1230, the super sampling apparatus may perform a first sampling on each of the sub-pixel regions determined in operation 1220 at regular periods.

In operation 1240, the super sampling apparatus may perform a second sampling according to an arbitrary sequence at a second regular period different from the regular period within the sub-pixel region in which the first sampling is performed.

In operation 1250, the super sampling apparatus may generate a low-resolution partial image corresponding to each of the sub-pixel regions based on the first sampling and the second sampling.

The operations of operations 1220 to 1250 may be performed by, for example, the double periodic LR image render module 716 described above.

In operation 1260, the super sampling apparatus may warp a high-resolution image of the previous frame output from a neural network to a current view corresponding to the current frame.

In operation 1270, the super sampling apparatus may replace a partial region of the high-resolution image of the previous frame warped in operation 1260 with the low-resolution partial image generated in operation 1250.

In operation 1280, the super sampling apparatus may obtain a high-resolution image of the current frame by applying the warped high-resolution image of the previous frame in which the partial region is replaced in operation 1270 to the neural network.

Figure 13:
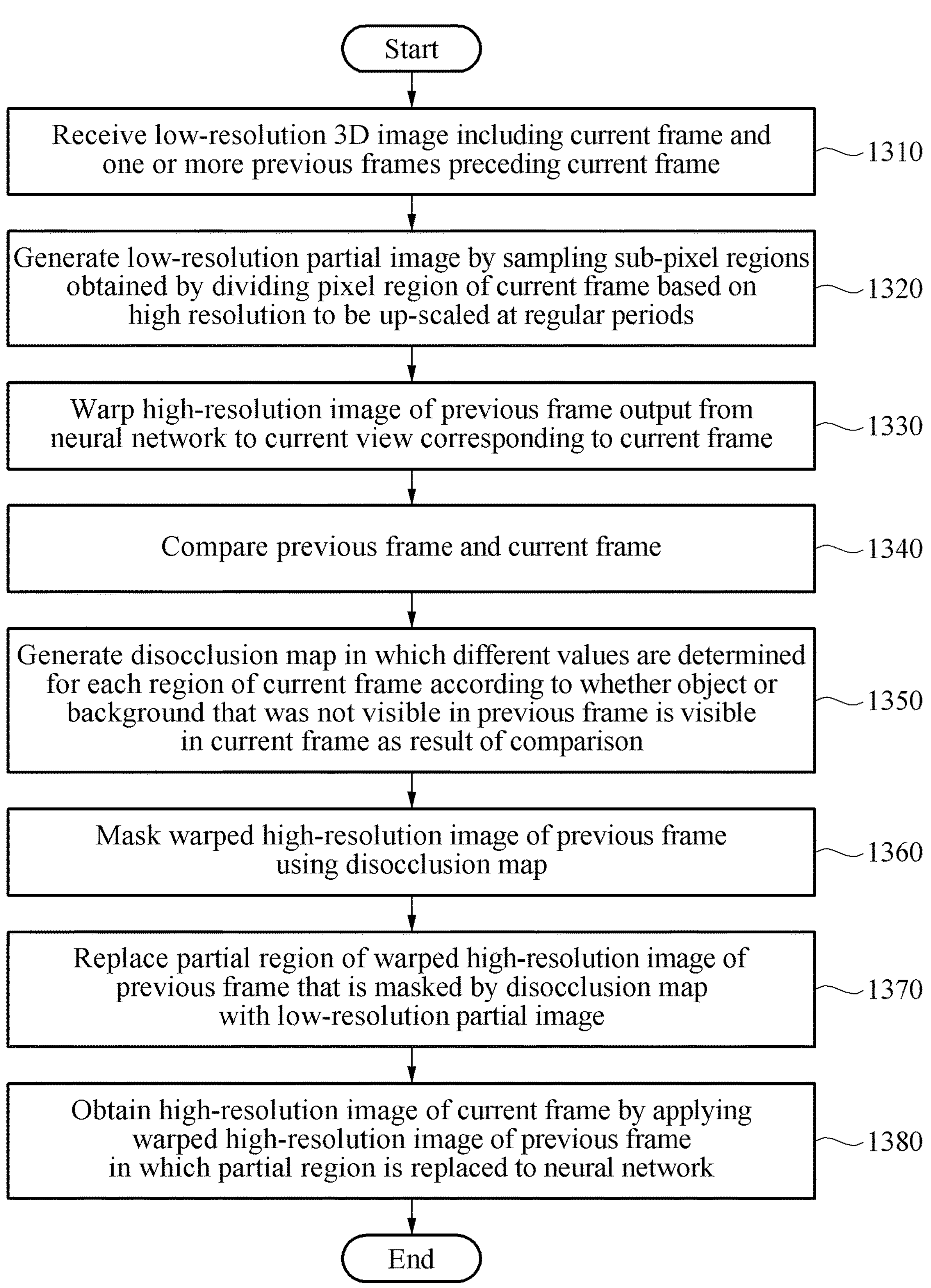

FIG. 13 illustrates an example of a super sampling method. Operations to be described hereinafter may be performed sequentially, but not necessarily sequentially. For example, the order of the operations may be changed and at least two of the operations may be performed in parallel.

Referring to FIG. 13, a super sampling apparatus may acquire a high-resolution image of a current frame through operations 1310 to 1380.

In operation 1310, the super sampling apparatus may receive a low-resolution 3D image including a current frame and one or more previous frames preceding the current frame.

In operation 1320, the super sampling apparatus may generate a low-resolution partial image by sampling sub-pixel regions obtained by dividing a pixel region of the current frame based on the high resolution to be up-scaled at regular periods via the periodic LR image render modules 216 and 917.

In operation 1330, the super sampling apparatus may warp a high-resolution image of the previous frame output from a neural network to a current view corresponding to the current frame via the backward warping modules 230 and 930.

In operation 1340, the super sampling apparatus may compare the previous frame and the current frame.

In operation 1350, the super sampling apparatus may generate a disocclusion map in which different values are determined for each region of the current frame according to whether an object or background that was not visible in the previous frame is visible in the current frame as a result of the comparison in operation 1340. The operations of operations 1340 and 1350 may be performed by the disocclusion map module 915 described above.

In operation 1360, the super sampling apparatus may mask the high-resolution image of the previous frame warped to the current view in operation 1330 using the disocclusion map generated in operation 1350. The super sampling apparatus may mask the high-resolution image of the previous frame warped to the current view by the aforementioned disocclusion masking module 940 with the disocclusion map.

In operation 1370, the super sampling apparatus may replace, via the replace module 950, a partial region of the warped high-resolution image of the previous frame that is masked by the disocclusion map in operation 1360 with the low-resolution partial image generated in operation 1320.

In operation 1380, the super sampling apparatus may obtain a high-resolution image of the current frame by applying the warped high-resolution image of the previous frame in which the partial region is replaced in operation 1370 to the neural network.

The examples described herein may be implemented using hardware components, software components and/or combinations thereof. A processing device may be implemented using one or more of general-purpose or special-purpose computers, such as, for example, a processor, a controller and an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

Although the examples have been described with reference to the limited drawings, one of ordinary skill in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents. Therefore, other implementations, other examples, and equivalents to the claims are also within the scope of the following claims.

What is claimed is:

1. A supersampling method, the method comprising:

receiving a low-resolution image comprising a current frame;

generating a first low-resolution partial image by sampling first sub-pixel regions of the current frame;

warping a high-resolution image, of a previous frame preceding the current frame, which has been outputted from a neural network, to a current view corresponding to the current frame;

replacing a first partial region of the warped high-resolution image of the previous frame with image data from the first low-resolution partial image;

generating a second low-resolution partial image by sampling second sub-pixel regions of the current frame after sampling the first sub-pixel regions;

warping the high-resolution image, of the previous frame preceding the current frame, which has been outputted from the neural network and to which the first partial region has been replaced with the image data from the first low-resolution partial image, to the current view corresponding to the current frame;

replacing a second partial region of the high-resolution image, to which the first partial region has been replaced with the image data from the first low-resolution partial image, of the previous frame, with image data from the second low-resolution partial image; and generating a high-resolution image of the current frame by applying the high-resolution image of the previous frame, in which at least the first and second partial regions have been replaced, to the neural network.

2. The method of claim 1, wherein the generating of the first low-resolution partial image comprises:

determining the first sub-pixel regions of one pixel region of the current frame by dividing the one pixel region into one high-resolution pixel region that is to be up-scaled; and generating the first low-resolution partial image corresponding to each of the first sub-pixel regions by sampling each of the first sub-pixel regions at regular periods.

3. The method of claim 1, wherein the replacing the first partial region is based on a disocclusion map.

4. The method of claim 1, wherein the replacing the first partial region comprises:

dividing the warped high-resolution image of the previous frame into a set of low-resolution partial images of respectively corresponding channels; and replacing one of the divided partial images with the generated first low-resolution partial image.

5. The method of claim 1, wherein:

the warping is based on a low-resolution motion vector map corresponding to the current frame and the previous frame.

6. The method of claim 5, wherein the low-resolution motion vector map indicates movement relationships between first pixels of the current frame and second pixels of the previous frame, and wherein the method further comprises generating the low-resolution motion vector map by rendering the low-resolution image.

7. The method of claim 5, further comprising:

up-scaling the low-resolution motion vector map to a high-resolution scaled motion vector map.

8. The method of claim 7, wherein the up-scaling is performed using an upscaling filter comprising a nearest neighborhood filter, a bilinear filter, or a bicubic filter.

9. The method of claim 7, wherein the warping comprises:

warping the high-resolution image of the previous frame output from the neural network to the current view based on the high-resolution scaled motion vector map.

10. The method of claim 1, further comprising:

comparing the previous frame with the current frame; and based on the comparing, generating a disocclusion map that identifies disocclusion regions of the current frame that were not visible in the previous frame and that are visible in the current frame.

11. The method of claim 10, wherein the disocclusion regions are identified by instances of a first value in the disocclusion map and non-disocclusion regions are identified by instances of a second value in the disocclusion map.

12. The method of claim 10, further comprising:

masking the warped high-resolution image of the previous frame using the disocclusion map.

13. The method of claim 12, wherein the masking comprises:

applying the disocclusion map to the warped high-resolution image of the previous frame such that:

a region of the warped high-resolution image corresponding to a disocclusion region of the disocclusion map is cleared; and a region of the warped high-resolution image corresponding to a non-occlusion region of the disocclusion map retains its original pixel values.

14. The method of claim 10, wherein the replacing the first partial region comprises:

replacing a partial region of the high-resolution image of the previous frame masked by the disocclusion map with the image data from the first low-resolution partial image.

15. The method of claim 1, wherein the neural network has an input resolution and an output resolution that are the same.

16. A non-transitory computer-readable storage medium storing instructions that, when executed by a processor, cause the processor to perform the method of claim 1.

17. A supersampling apparatus, the apparatus comprising:

storage storing a low-resolution image comprising a current frame and storing a previous frame preceding the current frame; and one or more processors configured to:

generate a first low-resolution partial image by sampling first sub-pixel regions of the current frame;

warp a high-resolution image, of a previous frame preceding the current frame, which has been outputted from a neural network, to a current view corresponding to the current frame;

replace a first partial region of the warped high-resolution image of the previous frame with image data from the first low-resolution partial image;

generate a second low-resolution partial image by sampling second sub-pixel regions of the current frame after sampling the first sub-pixel regions;

warp the high-resolution image, of the previous frame preceding the current frame, which has been outputted from the neural network and to which the first partial region has been replaced with the image data from the first low-resolution partial image, to the current view corresponding to the current frame;

replace a second partial region of the high-resolution image, to which the first partial region has been replaced with the image data from the first low-resolution partial image, of the previous frame, with image data from the second low-resolution partial image; and generate a high-resolution image of the current frame by applying the high-resolution image of the previous frame, in which at least the first and second partial regions have been replaced, to the neural network.

18. The apparatus of claim 17, wherein the one or more processors are further configured to:

determine the first sub-pixel regions of the current frame by dividing one pixel region of the current frame into one high-resolution pixel region to be up-scaled and generate the first low-resolution partial image by sampling each of the first sub-pixel regions.

19. The apparatus of claim 17, further comprising:

a memory comprising the neural network, wherein the neural network has been trained to output the high-resolution image of the current frame in response to the high-resolution image of the previous frame being input.

* * * * *